United States Patent
Chong et al.

(10) Patent No.: US 9,841,304 B2
(45) Date of Patent: Dec. 12, 2017

(54) AIR DATA SYSTEM

(71) Applicant: Rosemount Aerospace Inc., Burnsville, MN (US)

(72) Inventors: Peter M. Chong, Lakeville, MN (US); Ronald F. Liffrig, Prior Lake, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 33 days.

(21) Appl. No.: 14/689,966

(22) Filed: Apr. 17, 2015

(65) Prior Publication Data

US 2016/0305802 A1    Oct. 20, 2016

(51) Int. Cl.
| | |
|---|---|
| *G01F 1/46* | (2006.01) |
| *G01P 5/16* | (2006.01) |
| *G01P 13/02* | (2006.01) |
| *B64D 45/00* | (2006.01) |

(52) U.S. Cl.
CPC ............ *G01F 1/46* (2013.01); *B64D 45/00* (2013.01); *G01P 5/16* (2013.01); *G01P 13/025* (2013.01)

(58) Field of Classification Search
CPC ............ G01C 21/00; G01M 9/00; G01F 1/46
USPC ........... 73/180, 178 R, 147, 861.65; 340/973
See application file for complete search history.

(56) References Cited

U.S. PATENT DOCUMENTS

| | | | |
|---|---|---|---|
| 5,025,661 A * | 6/1991 | McCormack | G01L 19/0007 |
| | | | 73/180 |
| 6,668,640 B1 | 12/2003 | Alwin et al. | |
| 7,597,018 B2 * | 10/2009 | Braun | G01P 5/165 |
| | | | 73/178 R |
| 8,073,580 B2 | 12/2011 | Nutaro et al. | |
| 8,620,495 B2 | 12/2013 | Alwin et al. | |
| 8,695,412 B2 * | 4/2014 | Mandle | G01M 9/06 |
| | | | 73/147 |
| 8,761,970 B2 | 6/2014 | McIntyre et al. | |
| 9,116,162 B2 * | 8/2015 | Leblond | G01P 5/165 |
| 2009/0222150 A1 | 9/2009 | Preaux | |
| 2014/0018503 A1 | 1/2014 | Iwase et al. | |
| 2015/0054664 A1 * | 2/2015 | Dupont De Dinechin | |
| | | | B64D 43/00 |
| | | | 340/973 |

FOREIGN PATENT DOCUMENTS

| | | |
|---|---|---|
| EP | 1237005 A2 | 9/2002 |
| EP | 1275952 A2 | 1/2003 |
| EP | 1936386 A2 | 6/2008 |
| EP | 2527845 A1 | 11/2012 |

OTHER PUBLICATIONS

Extended European Search Report for European Patent Application No. 16165664.0, dated Jul. 20, 2016.

* cited by examiner

*Primary Examiner* — Jewel V Thompson
(74) *Attorney, Agent, or Firm* — Locke Lord LLP; Scott D. Wofsy; Joshua L. Jones

(57) ABSTRACT

An air data system includes an avionics system and a plurality of sensors associated with the avionics system, each of the sensors providing a signal indicative of a parameter used by the avionic system to determine the flight status of the aircraft. At least one air data probe is electronically coupled to the avionics system. At least one pitot static probe is coupled to a pressure transducer through pneumatic tubing, the pressure transducer is electronically coupled to the avionics system.

11 Claims, 1 Drawing Sheet

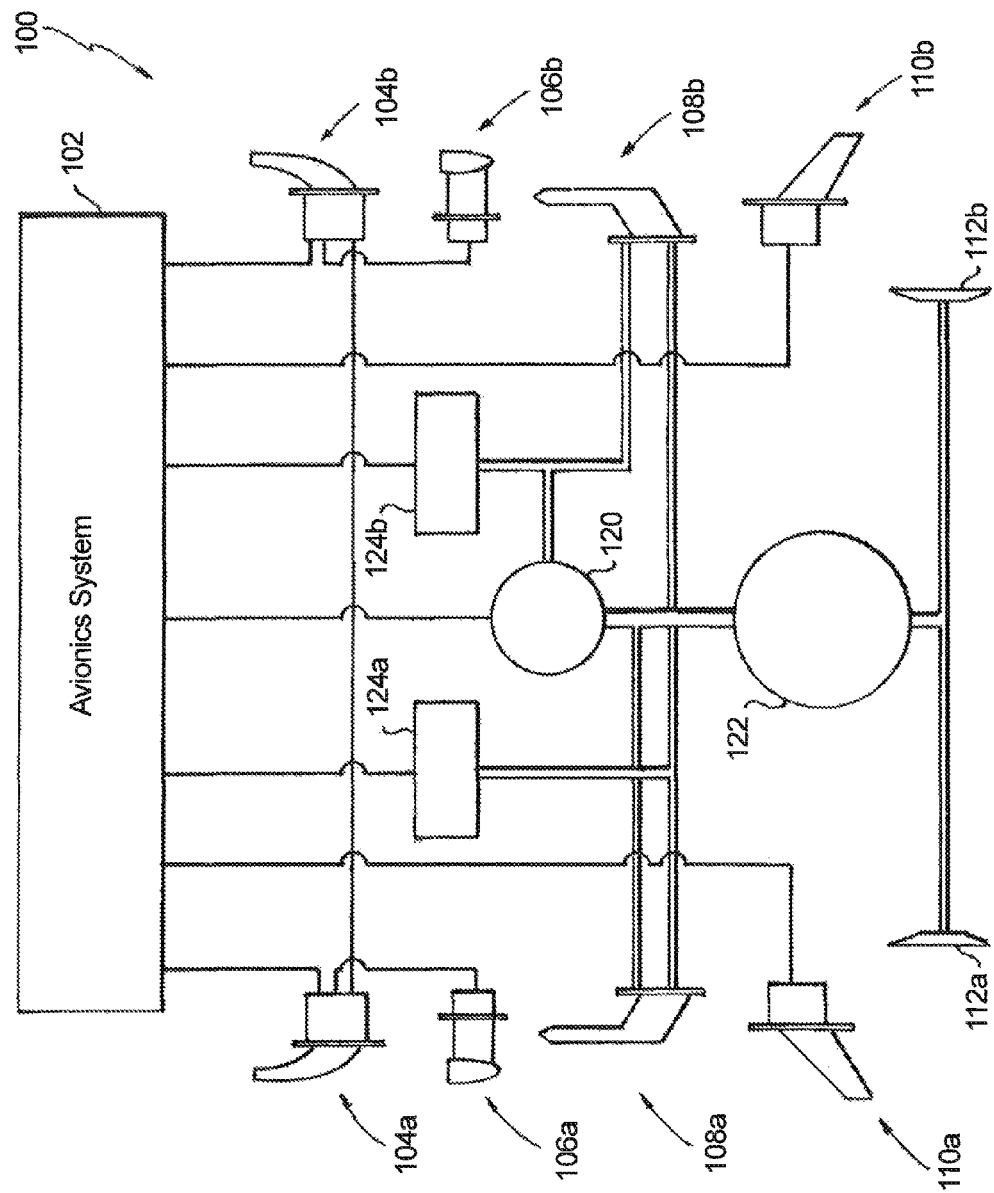

AIR DATA SYSTEM

BACKGROUND OF THE INVENTION

1. Field of the Invention

The present disclosure relates to aircraft, and more particularly to air data systems for use on an aircraft.

2. Description of Related Art

Commercial aircraft typically include a plurality of sensors/probes as part of an air data system for monitoring certain parameters used in controlling the aircraft. To insure fail-safe operation of the aircraft, redundant total pressure, total temperature, and static pressure sensors are typically provided. In conventional air data systems, probes on opposite sides of an aircraft can be pneumatically connected so that the pressure signals are averaged between the right side of the aircraft and the left side of the aircraft to provide a static pressure that true or is nearly true. It is desirable to reduce the number of probes on the exterior of the aircraft. Typically, redundancy is provided using four probes, with two probes positioned on each side of the aircraft. Elimination of one or more of these probes potentially reduces the cost, weight and extra tubing within the aircraft.

Such conventional methods and systems have generally been considered satisfactory for their intended purpose. However, there is still a need in the art for improved air data system. The present disclosure provides a solution for this need.

SUMMARY OF THE INVENTION

An air data system includes an avionics system and a plurality of sensors associated with the avionics system, each of the sensors providing a signal indicative of a parameter used by the avionic system to determine the flight status of the aircraft. At least one air data probe is electronically coupled to the avionics system. At least one pitot static probe is coupled to a pressure transducer through pneumatic tubing, and the pressure transducer is electronically coupled to the avionics system.

The plurality of sensors can include at least one total air temperature sensor electronically coupled to the at least one air data probe. The plurality of sensors can also include at least one angle of attack sensor electronically coupled to the avionics system.

The plurality of sensors can further include at least one static port coupled to a first consuming system through pneumatic tubing.

The at least one air data probe can include a left and right air data probe each electronically coupled to the avionic system. The left and right air data probes can be electronically connected to each other.

The left air data probe can be electronically coupled to a left total air temperature sensor and the right air data probe can be electronically coupled to a right total air temperature sensor.

The at least one pitot static tube can include left and right pitot static probes, each of the left and right pitot static probes can be coupled to a respective left and right pressure transducer through pneumatic tubing. The left and right pressure transducers can each electronically coupled to the avionics system.

The plurality of sensors can include a left and right angle of attack each electronically coupled to the avionics system. The plurality of sensors can include left and right static ports, each static port can be coupled to a first consuming system through pneumatic tubing.

The air data probes can be electronically coupled to the avionics systems to provide dissimilarity relative to the pitot static probes coupled through a pressure transducer which mitigates potential common mode faults within the air data system.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein:

FIG. 1 is a schematic view of an exemplary embodiment of an air data system constructed in accordance with the present disclosure, showing air data probes electronically coupled to an avionics system.

DETAILED DESCRIPTION OF THE PREFERRED EMBODIMENTS

Reference will now be made to the drawings wherein like reference numerals identify similar structural features or aspects of the subject disclosure. For purposes of explanation and illustration, and not limitation, a partial view of an exemplary embodiment of an air data system in accordance with the disclosure is shown in FIG. 1 and is designated generally by reference character 100.

The air data system 100 operates to deliver flight critical information to the aircraft and pilot throughout the flight. The air data system 100 includes an avionics system 102 coupled to a plurality of sensors. Each of the sensors provides a signal indicative of a parameter used by the avionics system 102 to determine the flight status of the aircraft. The sensors are similar to sensors known in the art for air data systems, however, air data system 100 incorporates air data probes 104a, 104b which eliminates a portion of sensors and pneumatic tubing typically found in traditional air data systems. Air data probes are connected only electrically in order to eliminate the need for pneumatic tubing passing between the opposite sides of the aircraft or between probes on the same side of the aircraft. This means that each probe is pneumatically independent, even if it is electrically communicating with other probes. Specifically, at least one air data probe 104a, 104b is electronically coupled (shown by a single line) to the avionics system 102. This may include hard wire or wireless communication. The addition of the air data probe 104a, 104b eliminates tubing, pressure transducers and drains relative to what is found in typical air data systems and provides dissimilarity relative to the pitot static probes which mitigates potential common mode faults within the air data system.

Air data system 100 includes redundant sensors and connections on the left and right side of an aircraft frame. Left air data probe 104a and right air data probe 104b are each electronically coupled to the avionics system 102 and electronically coupled to each other. The left and right air data probes 104a, 104b can include the SmartProbe® air data probe, which is a registered trademark of UTC Aerospace Systems of Charlotte, N.C. It is envisioned that the SmartProbe® air data probe can be retrofitted with existing air data systems to eliminate unnecessary material and weight to an aircraft.

With continued reference to FIG. 1, the plurality of sensors includes left and right total air temperature sensors 106a, 106b electronically coupled to the respective left and right air data probes 104a, 104b. The plurality of sensors also includes left and right angle of attack sensors 110a, 110b electronically coupled to the avionics system 102.

A left pitot probe 108a and a right pitot probe 108b are coupled to each other through pneumatic tubing (shown by a double line). The left and right pitot probes 108a, 108b are also coupled to a first consuming system (e.g., an elevator feel computer) 120 and to a respective left and right pressure transducers 124a, 124b. The left and right pressure transducers 124a, 124b are electronically coupled to the avionics system 102.

A left static port 112a and a right static port 112b are coupled to a second consuming system (e.g., a pneumatic standby) 122 through pneumatic tubing. The second consuming system 122 is coupled to the first consuming system 120 through pneumatic tubing. The left and right static ports 112a, 112b are then coupled to the avionics system 102 in a similar manner as the respective left and right pitot probes 108a, 108b, i.e., through the respective pressure transducers 124a, 124b.

The methods and systems of the present disclosure, as described above and shown in the drawings, provide for an air data system with superior properties including air data probes electronically coupled thereto. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. An air data system, comprising:
   an avionics system;
   a plurality of sensors associated with the avionics system, each of the sensors providing a signal indicative of a parameter used by the avionic system to determine the flight status of the aircraft;
   first and second air data probes, each being pneumatically independent, electronically coupled to the avionics system, and electronically connected to each other; and
   at least one pitot static probe coupled to a pressure transducer through pneumatic tubing, the pressure transducer electronically coupled to the avionics system.

2. The system of claim 1, wherein the plurality of sensors includes at least one total air temperature sensor electronically coupled to the at least one air data probe.

3. The system of claim 1, wherein the plurality of sensors includes at least one angle of attack sensor electronically coupled to the avionics system.

4. The system of claim 1, wherein the plurality of sensors includes at least one static port coupled to a first consuming system through pneumatic tubing.

5. The system of claim 1, wherein the first and second air data probes are left and right air data probes, respectively.

6. The system of claim 5, wherein the left air data probe is electronically coupled to a left total air temperature sensor and the right air data probe is electronically coupled to a right total air temperature sensor.

7. The system of claim 5, wherein the at least one pitot static tube includes left and right pitot static probes, each of the left and right pitot static probes coupled to a respective left and right pressure transducer through pneumatic tubing, the left and right pressure transducers each electronically coupled to the avionics system.

8. The system of claim 5, wherein the plurality of sensors includes a left and right angle of attack each electronically coupled to the avionics system.

9. The system of claim 5, wherein the plurality of sensors includes left and right static ports, each static port coupled to a first consuming system through pneumatic tubing.

10. The system of claim 5, wherein the air data probes provide a dissimilar signal indicative of a parameter used by the avionic system to determine flight status of the aircraft mitigating potential common mode faults within the air data system.

11. An air data system, comprising:
    an avionics system;
    a plurality of sensors associated with the avionics system, each of the sensors providing a signal indicative of a parameter used by the avionic system to determine the flight status of the aircraft;
    at least one air data probe that is pneumatically independent and is electronically coupled to the avionics system; and
    at least one pitot static probe coupled to a pressure transducer through pneumatic tubing, the pressure transducer electronically coupled to the avionics system.

* * * * *